July 11, 1944.  H. E. TAUTZ  2,353,202

SHAPER

Filed June 10, 1941  7 Sheets-Sheet 1

Inventor
Herbert E. Tautz,
By Carl A. Hellmann,
Attorney

July 11, 1944.　　　H. E. TAUTZ　　　2,353,202
SHAPER
Filed June 10, 1941　　　7 Sheets-Sheet 4

Inventor
Herbert E. Tautz
By Carl A. Hellmann
Attorney

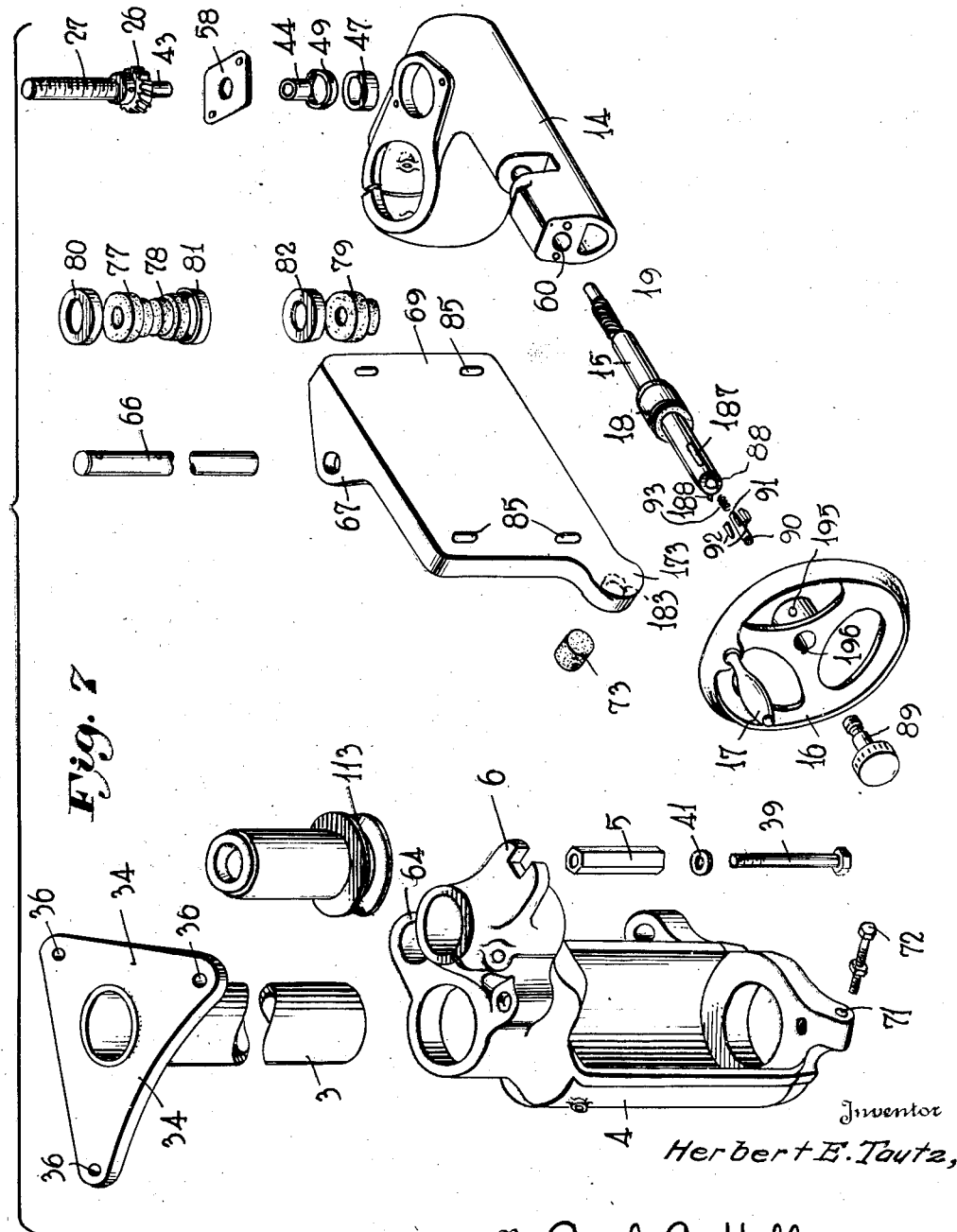

July 11, 1944.  H. E. TAUTZ  2,353,202
SHAPER
Filed June 10, 1941  7 Sheets-Sheet 6

Inventor
Herbert E. Tautz,
By Carl A. Hellmann,
Attorney

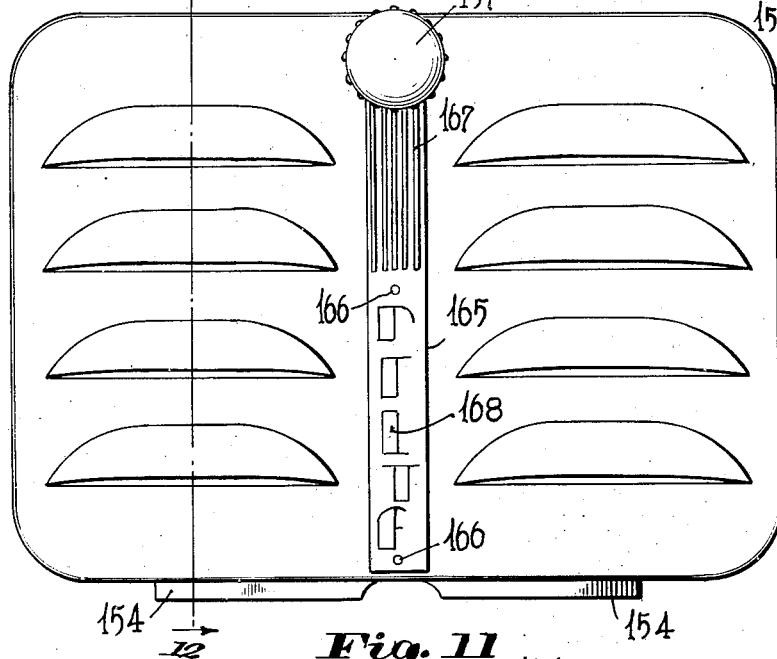
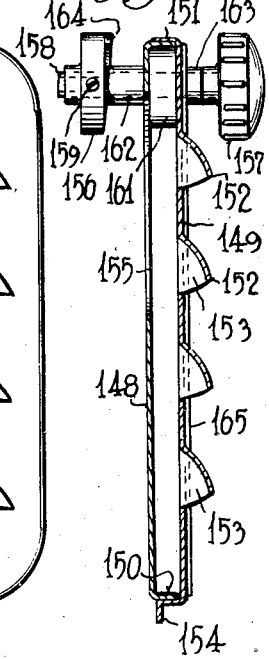
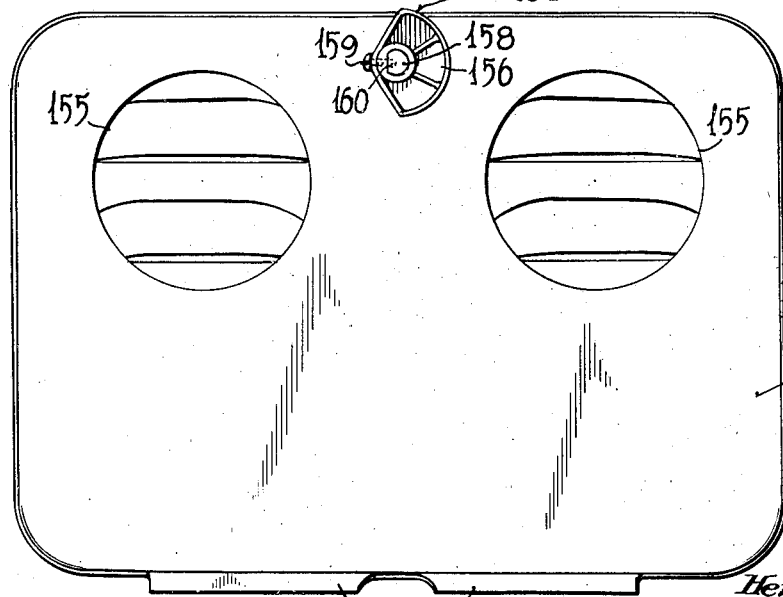

Patented July 11, 1944

2,353,202

UNITED STATES PATENT OFFICE 2,353,202

SHAPER

Herbert E. Tautz, Englewood, Colo., assignor, by mesne assignments, to Delta Manufacturing Company, Milwaukee, Wis., a partnership consisting of Marshall Field, Charles G. Cushing, and H. Campbell Stuckeman Application June 10, 1941, Serial No. 397,488

14 Claims. (Cl. 144—134)

The present invention relates to woodworking tools, such as shapers.

An object of the invention is to provide a machine of this nature having many advantages in compactness, strength and simplicity.

A further object is to provide a special type of removable door for the supporting casing of the machine, there being several doors in general, located on different sides of the casing, and so arranged as to produce a natural draft through the casing to assist in carrying off the heat generated by the motor and other mechanism therein. This door is of double-wall construction, and has louvers in its outer wall coacting with apertures in the inner wall. The door is not held by hinges, and thus is easily removable to give access to the inside of the cabinet, or to increase the ventilation when desired.

A feature of the invention consists in providing a relatively light casing of attractive design, which may be built up of sheet metal, having thereon a table or top which serves as the sole support for the mechanism, including the tool-carrying spindle and the motor for driving said spindle, together with all the devices necessary for adjusting the mechanism and drive motor.

This feature may be used also in other motor-driven tools and therefore it should be understood that it is not intended to restrict the present invention to shapers.

In a United States Patent No. 1,506,154, issued on August 26, 1924, to Berthelsen et al., for "Universal machine for joinery work," there is disclosed very diagrammatically a motor carrying a cutter spindle, which, under certain arrangements of the machine, may act as a vertical-spindle shaper. This is shown for example in Figs. 5 and 6 of the patent, wherein the motor is carried so as to be vertically adjustable, by means of a screw having a hand wheel at its lower end, said screw being threaded through a lug integral with the motor, and being mounted in the end of a bracket, which, when the machine is set up as a shaper, extends downwardly from what may be called the bed or table, said bracket and screw thus forming the sole support for the motor and the spindle carried thereby.

However, because of the great unsupported length, and the great overhanging weight of the motor and spindle, a guide necessarily is supplied for the spindle, said guide consisting of the cylindrical member 10 and the bearing located within the cross bore of said cylinder, as shown in Fig. 5, but not designated by a reference character.

The present invention relates to a further development of a shaper, wherein the construction is improved to support the motor and the tool spindle exclusively from a single rigid column supported by the table of the shaper, so that no bearing for the spindle need be mounted either in the table top itself or in structure supported thereby, as in the Berthelsen patent. Further improvements have of course also been made in other features of the shaper, as will be disclosed in detail hereinafter.

The invention also provides an improved type of work guide, embodying a ball-bearing supported ring concentric with the spindle of the shaper, but not attached thereto, so that it does not rotate with the spindle, as do the work-guiding collars heretofore used for this purpose.

To facilitate an understanding of the invention, a specific embodiment thereof in a shaper is described in the present specification and illustrated in the drawings accompanying the same. In said drawings:

Fig. 7 is an exploded view, showing in perspective the important parts of the mechanism, the motor being omitted;

Fig. 10 is a front elevation of a door used with the casing of the machine;

Fig. 11 is a rear elevation thereof; and

Fig. 12 is a vertical section through the door on the plane indicated by the line 12—12 of Fig. 10.

In all the figures, corresponding elements are indicated by the same reference characters.

Figure 1:
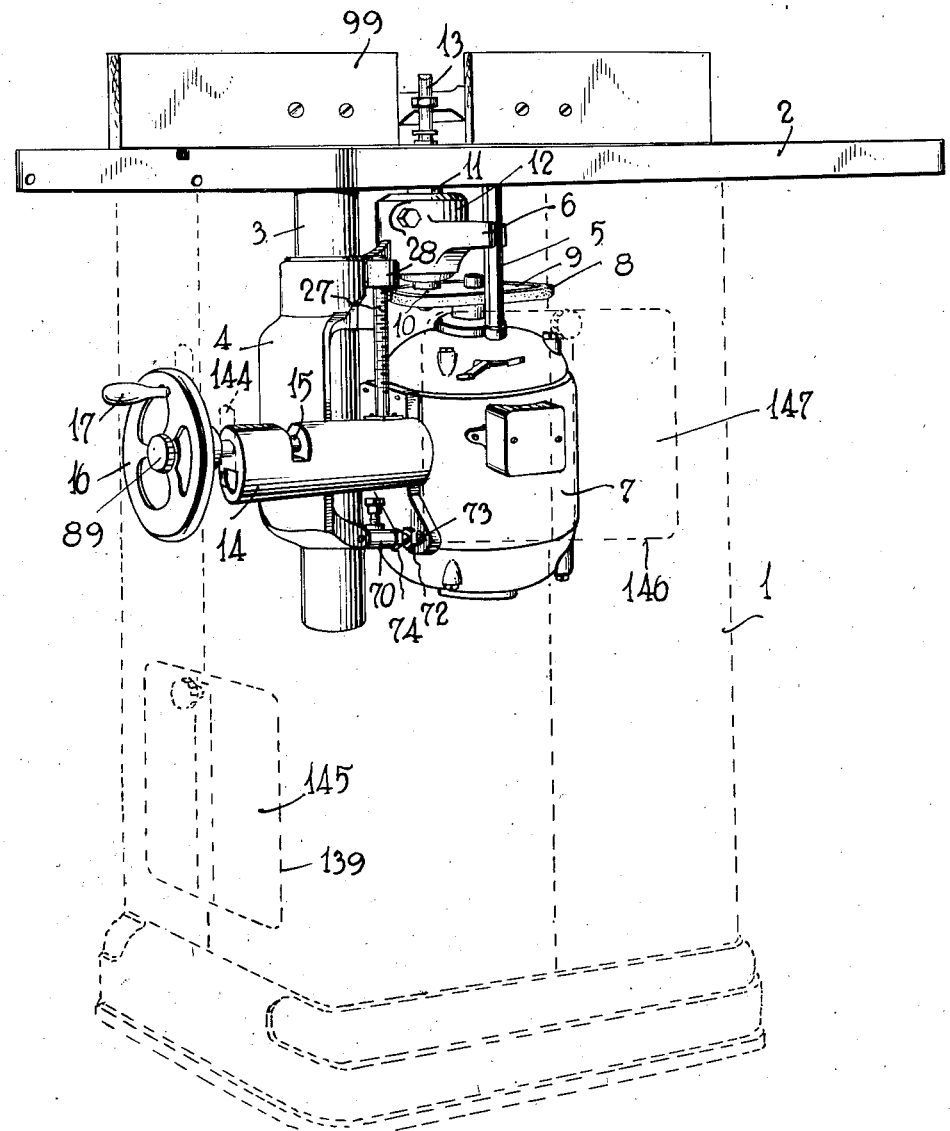
Fig. 1 is a perspective elevational view of the complete shaper, the casing being indicated in dotted lines to provide a view of the mechanism contained therein.

Referring first to Fig. 1, there is shown a casing 1 having a top 2 mounted thereon. The top 2 carries a column 3 suspended from its lower surface, and this column serves as the sole support for the entire mechanism. A carriage 4 slides vertically on this column 3 which preferably is externally cylindrical, the carriage 4 of course having correspondingly shaped guide-portions engaging said column.

In order to prevent rotation of the mechanism as a whole about the column 3, an auxiliary post 5 is also supported from the table top 2, this post 5 being here shown as of hexagonal configuration and serving to guide the lugs 6 which form the slotted end of the carriage. The motor 7 is carried by the carriage 4 by means of a suitable mounting plate, this motor being preferably of the ball-bearing type, which permits sustained operation with the shaft in a vertical position.

A suitable belt 8 connects the pulley 9 of the motor with a companion pulley 10 mounted upon a spindle socket 11 supported in the bearing bracket 12, and in turn adapted to receive a tool-carrying spindle such as 13.

Figure 2:
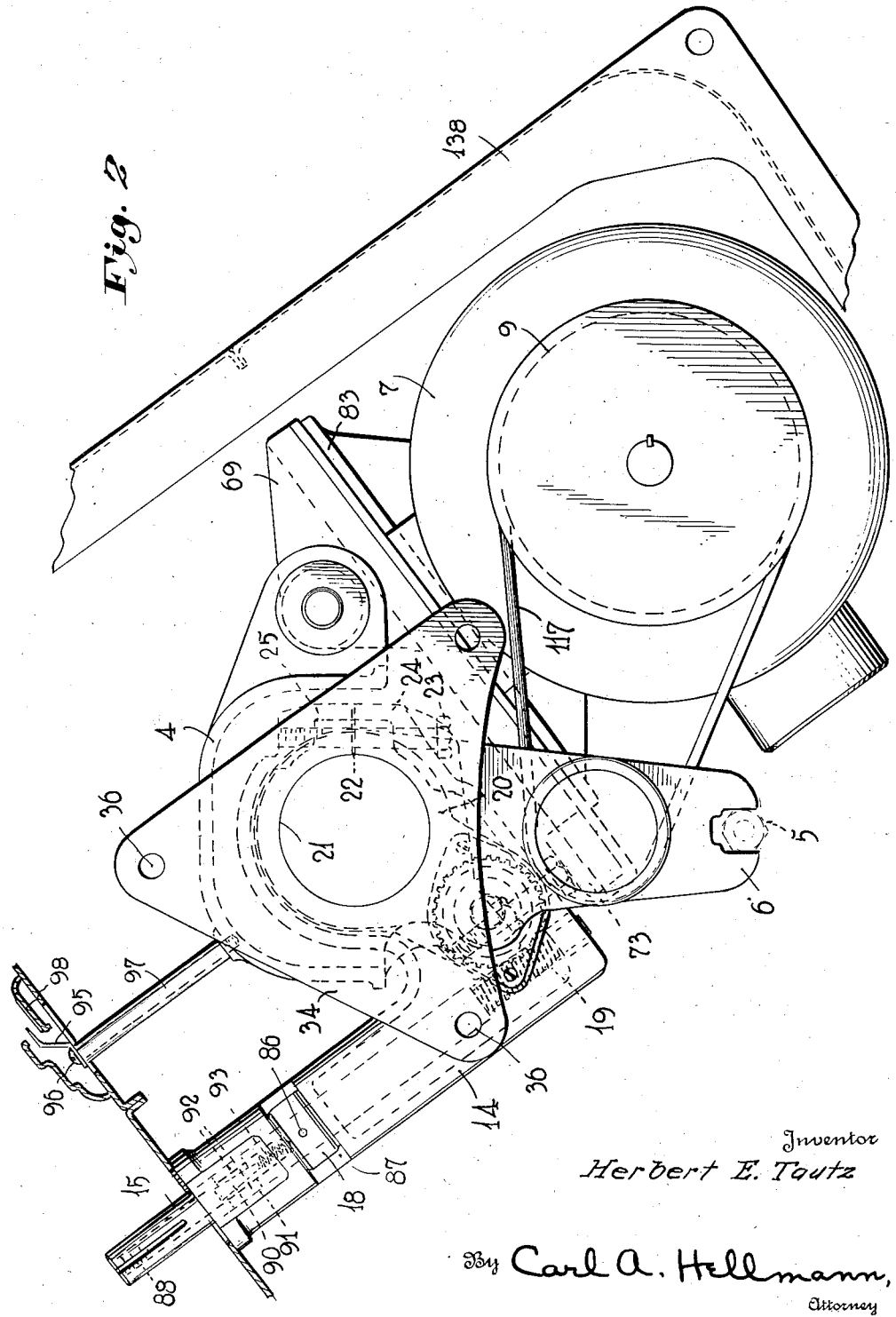
Fig. 2 is a fragmentary plan view of the machine, the casing being partly broken away and the table or top being omitted, to show the mechanism.

A mechanism for raising and lowering the whole assembly along the column 3 comprises the adjusting screw bracket 14, which carries a horizontal shaft 15 mounted for rotation therein and having at its outer end an operating means, such as the hand wheel 16, with a handle 17 attached thereto, the shaft 15 at its inner end having formed thereon a worm or spiral gear 19, best shown in Fig. 2. The bracket 14 has an offset portion 20, bored as shown at 21 to fit on the column 3, and split to produce a slot at 22 so that the bolt 23 passing through lugs 24 and 25 on opposite sides of slot 22 and engaged in threads in lugs 25 may be used to clamp the bracket 14 securely to the post 3 in its adjusted position.

Figure 3:
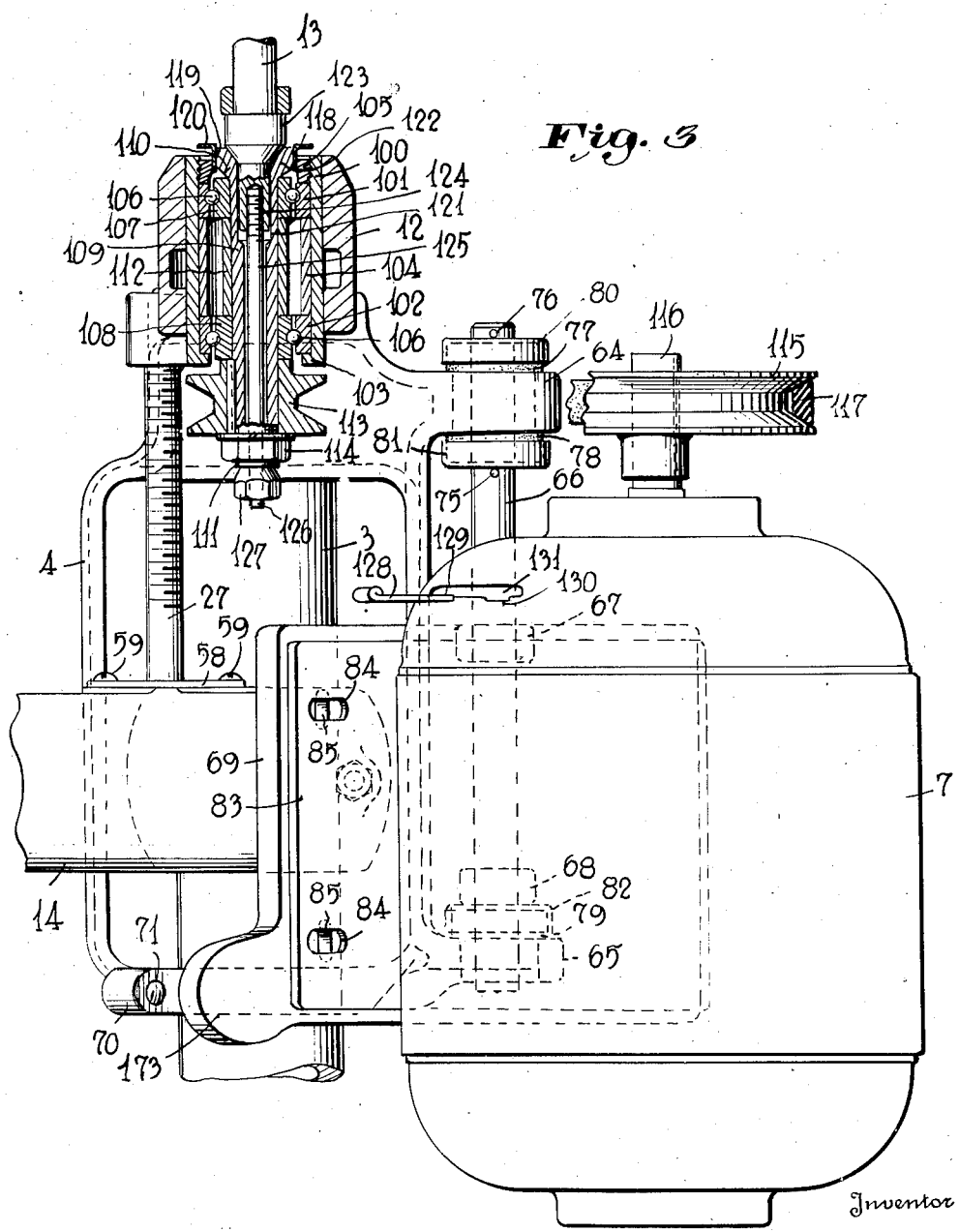
Fig. 3 is a partly sectional elevation showing the motor mounting means and the spindle of the shaper, the motor pulley and belt being partly broken away and the bearings for the spindle being shown in central longitudinal section.

The worm 19 engages a corresponding worm wheel or spiral gear 26 on a shaft 27, which extends vertically as shown in Fig. 3. This shaft 27 is threaded and screws into corresponding threads 28 in a lug 29 on the carriage 4, so that upon rotation of the hand wheel 16 the shaft 15 will turn the spiral gear 26 keyed to the shaft 27 as indicated at 30, thereby turning the shaft and causing the lug 29 to move up or down, carrying with it the carriage 4 which supports the motor-and-spindle assembly. During such vertical motion of this assembly the lugs 6 will slide along the guide post 5, thus preventing any disalinement of the mechanism.

Figure 4:
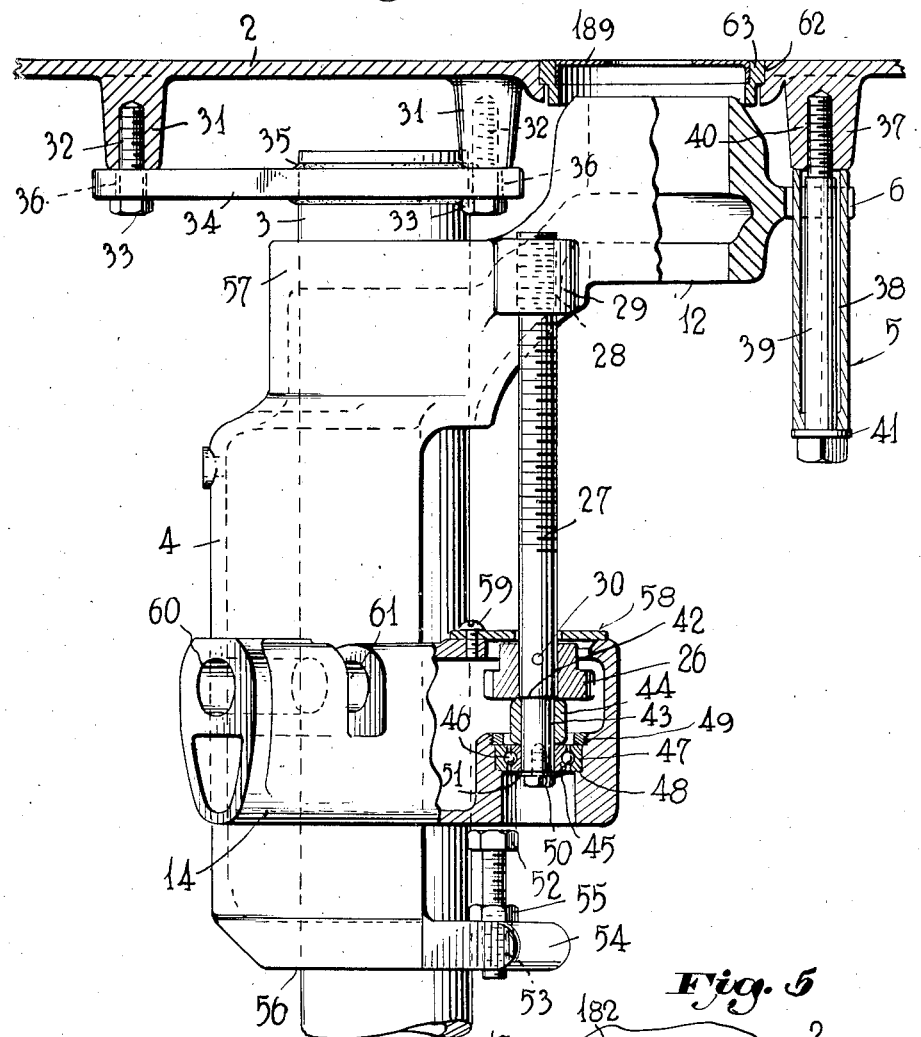
Fig. 4 is an elevation on an enlarged scale partly broken away and partly in section, and taken at substantially right angles to that of Fig. 3, showing the means for supporting the mechanism from the table top and for guiding said mechanism.

Referring to Fig. 4 certain details of this mechanism are disclosed on a larger scale. Lugs 31 are provided preferably by casting them directly on the lower surface of the table top 2, these lugs being threaded as at 32 to receive the cap screws 33 which pass through a flange 34 formed integral with, or welded to, the column 3 as indicated at 35. This flange 34 is shown in perspective in Fig. 7, to indicate its approximate shape. By providing three holes 36 in this flange or plate to receive the corresponding cap screws, an extremely rigid support is provided.

A further lug 37 is provided on the table top 2 to support the guide post 5. This is shown in detail as consisting of substantially an externally hexagonal tube 38 through which passes a cap screw 39 whose threaded portion 40 is engaged in corresponding threads in the lug 37. A washer 41 may be provided under the head of the cap screw 39. This construction makes it possible to tighten the hexagonal member 38 with its flats facing in any desired direction, to cooperate properly with the lugs 6 guided thereby, since the screw 39 is independent of the tube 38 and may be turned without moving said tube, and also permits turning the tube 38 to present new guide faces, when wear has occurred.

The shaft 27 may be supported at its lower end by means of a shoulder 42, below which said shaft has a portion 43 of reduced diameter, carried in a spacer 44, which in turn rests upon the inner race 45 of a ball-bearing which includes also the balls 46 and the outer race 47. This bearing is mounted upon a shoulder 48 formed in the bracket 14, and may be secured firmly in place by means of a nut 49 bearing against the upper face of the said outer race. The shaft 27 may be secured to the inner race in any desired way, a cap screw 50 and washer 51 being here shown for this purpose.

In order to limit the upward movement of the carriage 4 to prevent jamming any of the parts against the bottom of the table top, an adjustable stop 52 may be provided, consisting in the present instance of a cap screw threaded through an opening 53 in the lower projecting arm 54 of the carriage 4, so that upon turning the said screw the distance it projects upwardly from the arm 54 may be varied as desired, whereupon the lock-nut 55 may be tightened to retain such adjustment. As shown, the head of the screw 52 is about to touch the bottom of the bracket 14, thus limiting the upward movement of the carriage to approximately the position shown in Fig. 4.

The carriage 4 comprises two bored portions 56 and 57 located at the top and bottom thereof and fitting slidably on the column 3. These portions are thus spaced a considerable distance apart, and while each is of relatively small vertical extent and requires very little machining, nevertheless such spaced guides afford a very accurate and smooth gliding of the carriage.

In order to prevent chips or dust from entering the bore in the bracket 14 in which the worm wheel 26 operates, a cover plate such as 58 may be provided, and may be secured in place in any desired way, for example by screws such as 59. In Fig. 4 the shaft 15 is not shown, in order to show the alined bores 60 and 61 through which it passes.

Attached to or integral with the carriage 4 is the upwardly extending and laterally offset portion 12 which serves to receive the bearing cartridge in which the spindle is to be mounted. It will be noted that immediately above this bracket 12 there is a circular hole 62 in the table, shown in Fig. 4 as occupied by a reducer 63, and a second reducer 189.

Referring to Fig. 3, the carriage 4 is shown as having a lug 64 projecting from its upper portion and a corresponding lug 65 projecting from its lower portion. These lugs together serve as a mounting for the rod or pin 66 which acts as a hinge pin in connection with other lugs 67 and 68, formed on the motor mounting plate 69, upon which in the present instance the motor 7 is mounted.

A lug 70 projects from the lower end of the carriage 4 and has a threaded bore 71 therein to receive a cap screw 72 bearing against a yieldable plug 73 made of rubber or the like, mounted in or on a projecting portion 173 of the plate 69. This is shown in Fig. 1, and it will be understood that turning the screw 72 in a direction to unscrew it from the bore 71 will force the motor mounting plate 69 away from the carriage 4. This adjustment is employed when necessary to cause the motor to pivot about the hinge-pin 66 to increase the tension of the belt, which will be described hereinafter. The adjusted position may then be maintained by the lock-nut 74 threaded on the screw 72. The hinge-pin 66 is restrained from moving vertically by the pins 75 and 76.

Shock absorbers, in the form of thick rubber washers, are provided on the hinge-pin 66. These are shown at 77, 78 and 79, each being enclosed in a metal cup, as shown respectively at 80, 81 and 82. These shock absorbers will subdue vibration produced in the mechanism and provide quieter running, which is a very important advantage especially when the machine is used in a home work-shop, to prevent noise from being heard throughout the dwelling. The base 83 of the motor is secured to the plate 69 by bolts, not shown, passing through the mounting slots 84 of the motor base and the corresponding ones of the slots 85 of the motor mounting plate 69. It will be noticed that the slots 85 extend vertically while the slots 84 extend horizontally, thus making it more likely that they will cross to provide locations for the securing bolts.

Referring to Fig. 2, the mechanism for adjusting the vertical height of the motor and carriage is illustrated in somewhat greater detail. The shaft 15 has thereon a collar 18 which is secured thereto in any suitable way, as by the pin 86, this collar being retained within the groove 87 of the bracket 14 so that the shaft 15 cannot shift longitudinally.

While the screw or worm 19 coacting with the worm wheel or spiral gear 26 is in one sense self-locking, yet the vibration incident to the operation of the machine might cause a gradual descent of the operating mechanism. In order to prevent this, and provide means for rigidly holding the operating mechanism in its adjusted position, the shaft 15 is bored at the end which projects out of the casing 1, the outer end being threaded internally shown at 88, to receive corresponding threads on the clamping screw 89.

The end of this screw bears against the end of the pin 90, which has opposite slots 91 at its sides as shown, each of which slidably houses a wedge 92, that is, the wedges are housed in keyways in the said pin. A spring 93 bears against the innermost end of the sliding pin 90, and tends to force it outward against the clamping screw 89. The bottoms of the keyways are inclined to the longitudinal axis of the pin 90, to correspond to the taper of the wedges 92 so that when the screw 89 is turned to move into the bore, these wedges will be forced outwardly, through slot 187 in shaft 15 (see Fig. 7) into frictional contact with the bore 60 of the member 14, thus preventing any creeping due to vibration, and this makes it possible to do accurate work by rigidly holding the cutter at the desired elevation with respect to the table top. The wheel 16 may be secured rigidly to the shaft 15 in any suitable way, for example by a set screw 195, preferably of the headless type, in cooperation with a key 188 engaged in the keyway 196.

Attached to the carriage 4 is a pointer 95. This is held to the carriage by means of a screw 96 threaded into the carriage, and a tubular spacer 97, the parts being arranged as shown so that the position of the pointer 95 may be read on a scale 98 applied to the front of the casing 1.

Referring now to Fig. 3 the details of the bearing cartridge for the cutter spindle are shown, within the bearing bracket 12. The cartridge has a housing 100 having the two spaced outer ball races 101 and 102, the race 102 abutting against a shoulder at the bottom of the cartridge and being maintained at the proper distance from the race 101 by the spacing sleeve 104. The race 101 is in turn held in position by a threaded collar 105 screwed into the upper end of the wheel or casing 100, said collar thus maintaining both outer races rigidly in position. Often it will be found advantageous to "pre-load" these bearings, that is, to place them under a condition of initial stress, so as to take up lost motion, etc. This may be done readily by making the outer sleeve about two ten-thousandths of an inch longer than the inner sleeve 112.

Within each of the races there is a set of balls 106 which in turn rest also on the corresponding inner races 107 and 108. These are mounted on the hollow shaft 109 which has a shoulder 110 at its upper end and is threaded at its lower end as shown at 111. A spacing sleeve 112 is located below the race 107 so that by tightening the nut 114 on the threads 111 the entire assembly may be drawn together rigidly to form a rotatable socket for supporting the shaper spindle and adapted to be driven through the pulley 113 from the pulley 115 on the shaft 116 of the motor 7 by means of a V-belt 117.

A collar 118 having a cylindrical portion 119 engaging the outer surface of the hollow shaft 109 and a substantially flat annular flange 120 is provided to guard the bearing cartridge against the entrance of sawdust or other foreign material. The hollow shaft 109 preferably has an enlarged bore 121 at its upper portion surmounted by a frusto-conical portion 122 adapted to form a non-binding seat for a tool spindle such as 13.

It will be noted that the lower end 123 of the spindle 13 has a downwardly extending internally threaded portion 124 which receives the threaded end of a rod 125 extending through the bore of the hollow shaft 109 and threaded at its lower end 126 to receive a nut 127. By tightening this nut 127 the spindle may be locked securely into the hollow shaft 109, and properly alined by means of the coacting frusto-conical surfaces.

There is indicated at 128 a lever which will reverse the direction of rotation of the shaft 116 of motor 7, when moved from notch 129 to notch 130 in the slot 131. This is an important feature in shapers where the direction of rotation of the tool spindle must sometimes be reversed because of the direction of the grain of the wood being cut.

Figure 8:
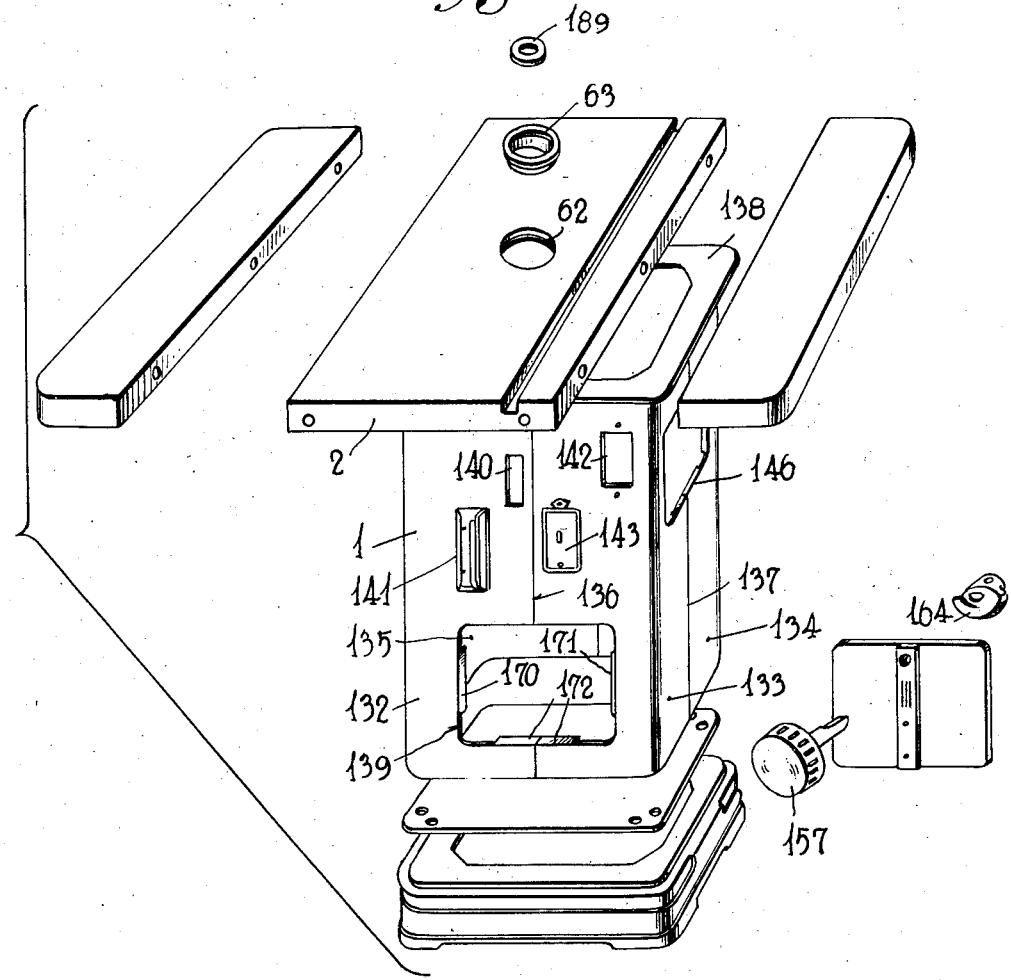
Fig. 8 is an exploded perspective view showing the casing and table top and associated parts.

By supporting the shaper mechanism proper entirely from the table 2 and making this strong and rigid, it becomes possible to employ a relatively light construction for the case or cabinet 1 which is herein disclosed as made of sheet metal. Fig. 8 shows details of its structure. It will be seen that the cabinet is made of four pieces of sheet metal 132, 133, 134 and 135 which are joined to form a prism or column, not at the corners but at the centers of the faces thereof as shown at 136 and 137 for example. This provides a relatively strong rounded vertical corner free from any seam or joints. Such corners are intrinsically strong and present a neat and finished appearance. Moreover the joints at the centers of the faces are made by bending the edge portions of each piece of sheet metal inward and abutting these portions against the corresponding neighboring one to which they are then secured in any desired way, preferably by spot welding. This materially stiffens the faces of the cabinet where such stiffening is most needed, namely at their centers. Additional stiffness is imparted to the top of the cabinet by the flange 138 secured thereto and serving in turn to support the table 2.

An opening 139 may be provided in one of the panels of the cabinet to receive a door giving access to the interior. Another opening 140 receives the scale 141 which cooperates with a suitable pointer 95 carried by the mechanism, for indicating the depth of cut, while a third opening 142 in the panel receives the switch 143 for controlling the motor. A slot or other opening 144 is also provided for the passage of the shaft 15 leading to the hand wheel 16 which controls the elevation of the cutter, as already described. A door 145 fits in the opening 139. Another opening 146 is provided in another panel as shown in Figs. 1 and 8. This is to receive another door 147 as indicated in Fig. 1.

It will be noted that the doors 145 and 147 are located at widely different heights. This will facilitate ventilation of the interior of the cabinet by producing a natural draft due to the heat produced by the motor 7. To increase the ventilation if desired, the doors may be opened or even removed entirely.

While the doors are designated as 145 and 147 to distinguish their positions in the machine, these doors nevertheless are identical with one another. Referring now to Figs. 10, 11, and 12 it will be seen that each such door is hollow and comprises an inner wall 148 and an outer wall 149, the inner wall having a flange 150 surrounding it and directed outwardly, whereas the outer wall has a similar flange 151 directed inwardly, and fitting closely over the flange 150, forming substantially a box and cover.

The outer wall 149 has a series of louvers 152 formed therein and arranged in the example herein disclosed in two vertical columns of four louvers each. Each louver provides a downwardly open passage 153 which permits flow of air through the outer wall. These louvers are preferably formed by stamping, directly from the material of which the outer wall 149 is made. At the lower edge of the flange 151 formed of this wall, there is a pair of downwardly directed tabs 154, which serve to catch behind the lower edge of the door opening 139 or 146 in the casing 1. The inner wall 148 has a number of openings 155 therein, of any arbitrary shape, herein shown as circular. These openings in conjunction with the louvers in the other wall thus provide passages through which air may circulate freely, while nevertheless no openings are visible from the exterior, from ordinary eye level. In order to secure the two members 148 and 149 to one another, any customary securing means may be employed, preferably a number of welds distributed at suitable locations.

A latch 156 is preferably provided near the upper end of the door and an ornamental knurled knob 157 cooperates with the same, a shaft 158 being carried by the knob 157 and traversing the latch member 156, to which it may be secured by any suitable means such as the screw 159. The shaft 158 is preferably flattened as shown at 160, the latch 156 having a correspondingly shaped hole to fit on such flattened end of the shaft. In order to provide a suitable bearing for the shaft 158, an insert 161 consisting of a body portion received between the walls 148 and 149, and two tubular extensions 162 and 163 is suitably secured near the top of the door as best shown in Fig. 12.

The latch 156 preferably has a cam surface 164 formed thereon as shown in Figs. 8, 11 and 12, and adapted to coact with suitable means on the inside of the casing 1 above the door opening, first to engage behind the same when the knob 157 is turned and then to draw the parts tightly together upon further rotation. An ornamental strip of material 165 best shown in Fig. 10 may be secured to the center of the front of the door in any suitable way as by the rivets 166. This strip may be of polished or plated material, and as shown has ornamentation consisting of vertical stripes 167 in its upper portion, while the lower portion may be left blank or may contain a suitable brand or trade name 188 of the mechanism.

It will be seen that a door made as herein disclosed has the great advantage that no hinge is present, since the lower end of each door merely hooks behind the corresponding lower edge of the door openings and is held in place thereat solely by the tabs 154, engaging behind the flanges 172 while the upper end of each door is held adequately and firmly by the latch 156, and yet is freely removable by simply turning said latch. The sides of the doors are received between the flanges 170 and 171. Whenever access to the interior of the casing 1 is desired, it is a very simple matter to remove one or both doors. Moreover, while the circular openings and louvers afford normally adequate ventilation, when the doors are closed, if increased air flow is desired, it is necessary merely to remove the doors.

It will be understood that the heat produced by the electrical losses of the motor and any frictional heat generated in the casing will impart warmth to the air in the casing and thus promote a natural draft, for example entering through the lower door opening 139, and leaving by way of the upper opening 146. These two openings are in different walls of the casing and thus serve to distribute the draft through the interior of the casing 1. Additional air currents are also produced to a lesser degree by moving parts within the casing such as the belts and pulleys and the rotating parts of the motor 7, which often includes a centrifugal fan built thereinto by the manufacturer.

Figure 6:
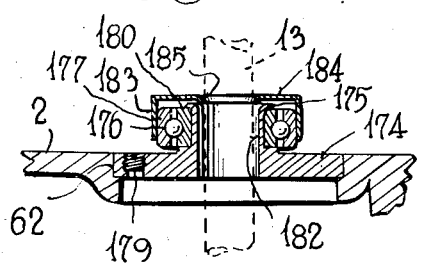
Fig. 6 is a vertical section through the same on the plane indicated by the line 6—6 of Fig. 5.
Figure 5:
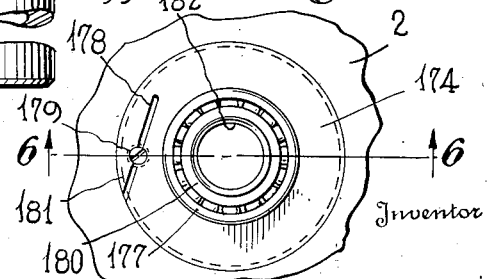
Fig. 5 is a plan view of a rubbing collar which may be inserted in the hole in the table to assist in guiding a work-piece.

In Figs. 5 and 6 is illustrated a work guide. This guide is an improvement on the ring or collar type heretofore known, which consists of a spacing collar mounted on and carried directly by the spindle. The new guide surrounds the spindle but does not move therewith, and comprises a plate or flange 174 in the form of a disk which can be placed in the bore 62 of the table 2 in place of the reducer 63 of Fig. 4.

The flange 174 may be secured in the table top 2 in any desired way, but it is preferred to provide a slot 178 cooperating with a slightly tapered screw 179, so that tightening the screw by screwing it downward will expand the tongue 181 against the outer wall of the table bore 62.

A tubular portion 182 extends upward from the ring 174, and fits within the inner race 180 of a ball bearing. This race may be secured in place by flanging out the upper end of the tubular portion, as shown at 175. The outer race 177 is supported rotatably about the inner race 180 by means of the balls 176 or equivalent rolling elements.

While the outer cylindrical surface of the race 177 could serve as a guide for a work piece, this would be open to the objection that chips or other foreign matter might lodge between the races and interfere with proper operation of the ball bearing. It is therefore preferred to provide a shield for the anti-friction bearing, as indicated at 183. It will be noted that this is here shown as a substantially cup-shaped element fitting over the race 177 and having a substantially horizontal flange portion 184 extending radially inward, so as to cover the open space between the inner and outer races.

To further close the said bearing against the entrance of foreign material, this flange 184 may have a downwardly turned lip 185 at its central portion, extending slightly below the level of the flange 175 on the tube 182. Obviously any other type of anti-friction bearing, preferably sealed against the entrance of chips and the like, and preferably pre-lubricated, could be employed, and therefore the invention is not limited to the precise details illustrated.

While the operation of the machine can be understood in large measure from the description of its structure, it may be desirable nevertheless to summarize it briefly for the sake of completeness. It will be understood of course that the shaper may be used in substantially the same way as any conventional shaper, that is, the operator of the machine will be able to apply it to any of the purposes customarily served by a machine of this kind.

Figure 9:
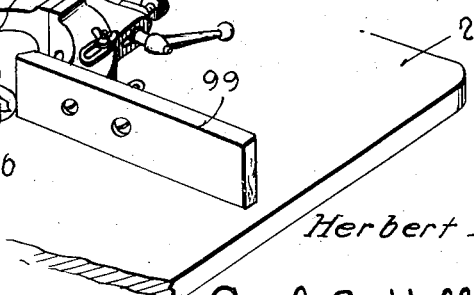
Fig. 9 is a perspective view, partly broken away, showing a guide for the work-pieces on the table.

A suitable cutter 186 will first be selected and placed on the spindle 13, as indicated diagrammatically in Fig. 9 whereupon the spindle is placed in position as in Fig. 3 and clamped securely by means of the rod 125 and nut 127. Thereupon the spindle 13 carrying the cutter will be raised or lowered to the desired position by means of the hand wheel 16, which may be turned either by means of its rim or by use of the handle 17, as preferred. This will raise or lower the carriage 4 on the depending column 3, carrying along the motor 7 and the spindle 13, together with all the mechanism connecting them.

When the cutter has been adjusted to the desired height, the shaft 15 may be locked against any possible creeping, by tightening the screw 89. The shaper mechanism will be supported entirely by the said carriage 4, which in turn is mounted solely on the column 3. The guide member 5 assists in maintaining the spindle 13 in proper alinement with the opening 62, and does not in any way support any of the weight of the carriage.

By reason of the fact that the tube 5 is hexagonal, it has three pairs of opposite faces or flats, each spaced correctly to fit in the fork at 6. When any pair of faces wears sufficiently to cause inaccuracy in positioning of the spindle 13, it is necessary merely to loosen the screw 39 sufficiently to permit turning a new pair of said flats into proper position to coact with the fork 6, to restore the desired accuracy of the machine. Preferably the tube 5 is made of material different from that of the fork 6, the said fork suitably being relatively hard, so that most of the wear will be on the tube, which is readily and cheaply replaceable after all its flats have become worn, thus saving the much more expensive carriage.

The guide 99 is used in conjunction with the cutter 186 in the customary way, the work piece being guided by the table top 2 and by the vertical guide surfaces of said guide 99, which is disclosed in detail in Patent 1,947,885 issued Feb. 20, 1934, to which reference may be had for further information.

However, for certain types of work it may be preferable to make use of the guide disclosed in Figs. 5 and 6 of the present case. It will be noted that when use is made of this type of work guide, the reducing collars 63, 189 or the like are removed from the opening 62 in the table top, and the flange 174 is substituted. While the reducing collars 63, 189 etc. need not be secured with extreme rigidity in the table top, as they merely form continuations of the upper surface of the table, this is not true of the flange 174, which must be secured very firmly in position, as it carries the work guiding element 183, against which the work piece may exert considerable pressure.

Hence the screw 179 is used to force the tongue 181 against the edge of the opening 62 as shown in Fig. 6, which will provide a very rigid grip.

Attention is directed to the fact that in contrast to the heretofore known "rubbing collars," no part of the new guide structure touches the spindle 13, and the portion 183 thereof turns only when the work piece is fed along in contact therewith. This has the great advantages that first, the guide does not tend to feed along the work piece, due to frictional engagement therewith, as did the conventional rubbing collars, turning with the spindle, and second, the new guide does not tend to wear away or burn the work piece when the latter is forcibly held against motion, while in contact with the outer surface of the guide, as would be the case with collars rotating with the spindle.

The rubber shock-absorbing elements 73, 77, 78 and 79 serve to cushion vibration and prevent the same from being transmitted to the casing and thence to the floor, which is a very important feature, particularly in machines installed in residences or other places where vibration and noise are highly objectionable.

The pointer 95, in conjunction with the scale 98, is useful in indicating the height of the cutter with respect to the table top. The pointer may be adjusted slightly, by loosening the screw 96 and turning the pointer 95 about the axis of said screw.

Preferably the pulley 113 will be no larger in diameter than the outside of the tubular casing 100, which may facilitate removing and replacing the parts, by sliding the whole spindle mechanism and bearing through the bore in the portion 12 of the carriage.

The tension of the belt may be adjusted when necessary by means of the screw 72, which abuts against the rubber bumper 73 and which causes the motor mounting plate 69 to move pivotally about the hinge pin 66. The direction of rotation of the motor shaft may be reversed by means of the lever 128, when and if necessary.

The casing is ventilated adequately through the doors shown in Figs. 10, 11, and 12, which however have no openings extending directly therethrough, when seen from the usual eye level of the operator, thus serving two distinct purposes, first the provision of sufficient cooling by natural draft due to the heat generated within the casing and assisted by the windage of the moving parts, and second the deflection of any particles of wood carried by the draft or thrown out by the moving parts, which might strike directly into the face of the operator, since there is no unobstructed straight path from the interior of the casing in such direction, this feature incidentally also improving the appearance of the machine. Whenever necessary, the doors may be removed entirely, since there are no hinges of the usual type.

While the invention has been disclosed in considerable detail as applied to a specific type of vertical spindle shaper, it should be understood clearly that this has been done solely in an illustrative sense, and not with any intention of limiting the invention to said details. For an understanding of the scope of the invention, attention is therefore directed to the claims.

I claim:

1. A shaper comprising a work table, means for supporting said table, a downwardly extending guide carried by said table, a carriage movable along said guide, means secured to the guide and including mechanism coacting with the carriage to move said carriage along the guide, additional means supported by the table and slidably engaging a portion of the carriage to provide correct alinement of the carriage and table, a spindle carried by the carriage, a motor also carried by the carriage, pulleys on the motor and spindle, a belt connecting said pulleys and means for adjusting the tension of the belt.

2. A shaper comprising a work table, means for supporting said table, a downwardly extending cylindrical guide carried solely by said table, a carriage having spaced bores fitting along and securable to the guide and including mechanism coacting with the carriage to move said carriage along the guide, additional means supported by the table and engaging a portion of the carriage to provide correct alinement of the carriage and table, a spindle carried by the carriage, a motor also carried by the carriage, and means for driving said spindle from said motor.

3. A shaper comprising a work table, means for supporting said table, a downwardly extending tubular guide secured to the under side of said table, a carriage movable along said guide, mechanism supported by the guide and coacting with the carriage, to move said carriage along the guide, additional means supported by the table to provide correct alinement of the carriage and table, a spindle carried by the carriage, a motor also carried by the carriage, and means connecting the motor and spindle to drive the latter.

4. An adjusting device for a machine, comprising a substantially vertically extending guide member, a bracket slidably adjustable along the same, a carriage having a threaded opening therein, a screw carried by the bracket and having its axis substantially parallel to the general direction of the guide member, the threads of said screw engaging within the threaded opening of the carriage, means restraining said screw from axial motion and means for turning the screw about its axis at will, thereby causing the carriage to move along the said guide member.

5. In a machine having a work supporting table, a spindle extending through said table, and means for rotating said spindle, a guide member depending from the underside of said table, a carriage for carrying said spindle and the means for rotating it, said carriage being mounted to move along the said guide member, said carriage having a threaded opening therein, a screw having its axis substantially parallel to the general direction of the guide member, the threads of said screw engaging within the threaded opening of the carriage, means supported by the guide member, and carrying said screw, means restraining said screw from axial motion and means for turning the screw about its axis at will, thereby causing the carriage to move along the said guide member.

6. In a machine having a work table, means for supporting said table, a guide carried by said table, a carriage movable along said guide, means mounted on said carriage for carrying and rotating a cutting tool and means comprising gearing for shifting the carriage along the said guide, means for actuating and locking said gearing, comprising a shaft, said shaft having a longitudinal bore therein, a spring in said bore, a pin in said bore and bearing against said spring, the outer end of the bore being threaded, a screw engaged therein and bearing against said pin, said pin having a longitudinally tapered portion, a wedge of corresponding taper engaging said portion, there being a transverse slot in the shaft adjacent the location of the pin, and means secured to the guide and forming a bearing for the shaft, whereby tightening the screw will force the wedge transversely outward in said slot, into engagement with the inner surface of said bearing, thereby firmly securing the shaft against rotation in its bearing.

7. In a shaper, a substantially centrally apertured work table supported adjacent its margins by a housing structure, so as to leave the space below said table adjacent the aperture unobstructed; a single cylindrical column mounted on the underside of said table adjacent said aperture and extending substantially vertically downwardly and terminating in a free end spaced above the bottom of said housing; a carriage having cylindrical portions embracing and slidably mounted on said column; a spindle journalled for rotation about a substantially vertical axis in said carriage and projecting upwardly through the aperture in said table; a motor carried by said carriage and drivingly connected to said spindle; a guide secured to said table and projecting downwardly therefrom in spaced parallel relationship to said column; means on said carriage, slidably coacting with said guide, for preventing any appreciable angular movement of said carriage about the axis of said column; and means for moving said carriage up and down along said column.

8. In a shaper, a table having a spindle aperture therein remote from the margins thereof; means for supporting said table; a column rigidly secured to the underside of said table adjacent said aperture; a carriage mounted for vertical sliding movement on said column, said carriage comprising a pair of vertically spaced guide portions snugly fitting around said column and a connecting yoke disposed to one side of and spaced from said column; a spindle journaled in said carriage and projecting through the aperture in said table; a motor drivingly connected to said spindle; and means, comprising a member anchored to said column between said guide portions of said carriage, for advancing said carriage along said column.

9. The shaper defined in claim 8, wherein said spaced guide portions are each provided with a journal to one side of said column, said journals being vertically aligned and pivotally supporting a plate mounting said motor, and means are provided on one of said guide portions for limiting pivotal movement of said plate.

10. The shaper defined in claim 8, wherein said spindle is journalled in a bearing support integrally formed with one of said guide portions.

11. The shaper defined in claim 8, wherein said member anchored to said column rotatably supports a horizontal shaft and a vertical screw connected together by drive means, and said screw is threaded into a boss integrally formed on said carriage.

12. The shaper defined in claim 8, wherein the lower of said guide portions is provided with an upwardly directed threaded device coacting in abutting relationship with the underside of said anchored member, for limiting upward movement of said carriage along said column.

13. The tool defined in claim 7, wherein said column, said spindle and said guide are disposed in a substantially common vertical plane, for minimizing angular swing of the axis of said spindle about the axis of said column in response to any angular swing of said carriage about the axis of said column, as the result of lost-motion in said means on said carriage slidably coacting with said guide during operation.

14. In a wood working tool, a table; means for supporting said table; a cylindrical column secured to the underside of said table, said table having an opening adjacent said column; a carriage mounted for vertical sliding movement along said column; a cutter spindle journalled in said carriage to one side of said column and projecting upwardly through the opening in said table; a motor drivingly connected to said spindle; means for moving said carriage into various adjusted positions along said column; a guide secured to the under side of said table and extending downwardly in parallel relationship to said column and spaced therefrom a distance greater than the spacing of said spindle from said column; and a pair of spaced abutments on said carriage slidably coacting with opposite sides of said guide, for restraining said carriage against rocking about said column while permitting free sliding movement therealong, said guide comprising a post rigidly secured to said table and an elongated tubular member having a plurality of pairs of opposed flat sides extending longitudinally of its external surface, and an inner bore throughout its length, said post extending through said bore to mount said tubular member for rotative selection with a predetermined pair of sides, and said abutments comprising flat surfaces selectively and slidably coacting with one pair of the opposed sides of said tubular member.

HERBERT E. TAUTZ.